Feb. 20, 1968 W. RÖSLER 3,369,575
APPARATUS FOR THE MANUFACTURE OF NETTING WITH INTERSECTING
AND WELDED LONGITUDINAL AND TRANSVERSE FILAMENTS OR WIRES
Filed Aug. 19, 1965 5 Sheets-Sheet 1

INVENTOR
WALTER RÖSLER
BY
*[signature]*
attys

INVENTOR
WALTER RÖSLER
BY

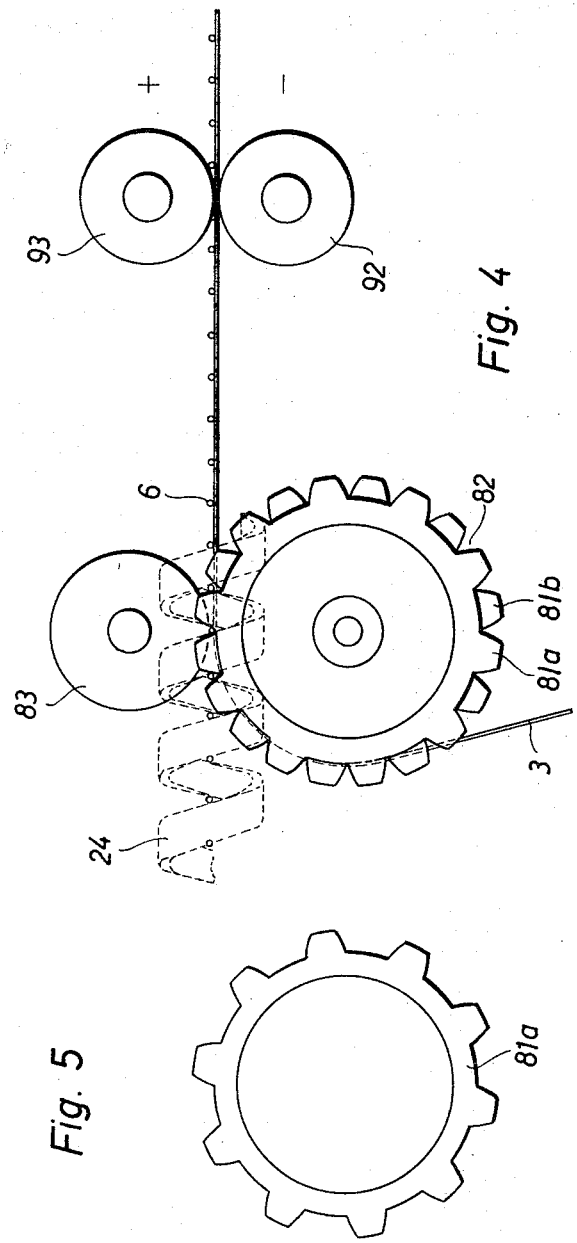

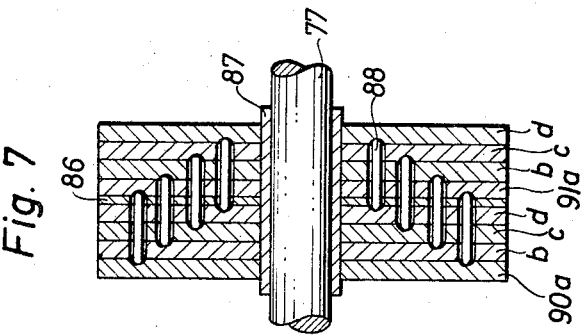
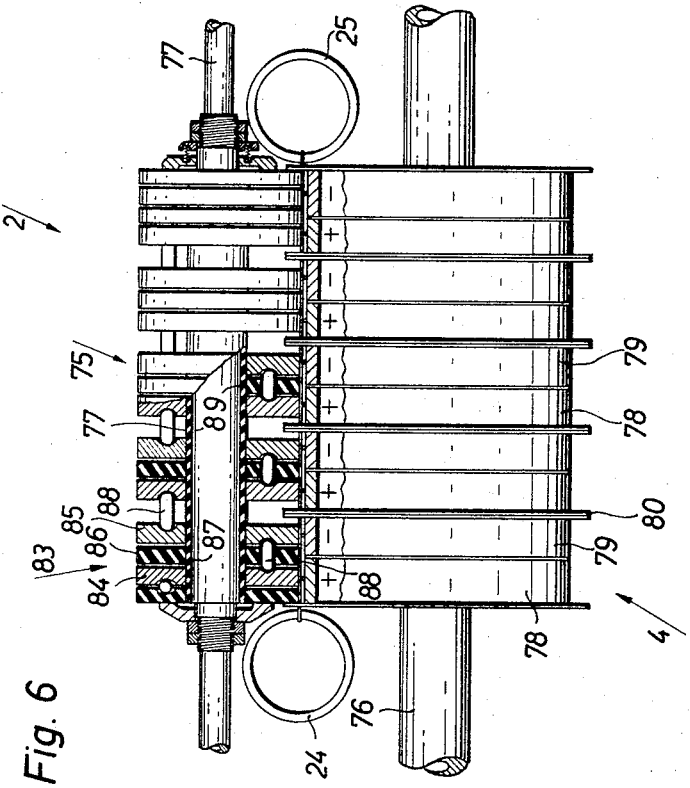

United States Patent Office 3,369,575
Patented Feb. 20, 1968

3,369,575
APPARATUS FOR THE MANUFACTURE
OF NETTING WITH INTERSECTING
AND WELDED LONGITUDINAL AND
TRANSVERSE FILAMENTS OR WIRES
Walter Rosler, Am Springs, Delecke
(Mohnsee), Germany
Filed Aug. 19, 1965, Ser. No. 480,989
Claims priority, application Germany, Aug. 22, 1964,
R 38,651; July 20, 1965, R 41,135
12 Claims. (Cl. 140—112)

ABSTRACT OF THE DISCLOSURE

The invention disclosed herein relates to novel apparatus for manufacturing netting with intersecting longitudinal and transverse strands, filaments or wires which are welded or secured to one another.

Background of the invention

Nets or netting having intersecting strands at right angles or obliques angles are well known. It is also conventional for the longitudinal and transverse strands of the nets to be welded to one another at points of intersection so that the net is extremely strong.

Conventional right-angle mesh are manufactured by diverse conventional apparatus. For example, in the manufacture of nets having strands which intersect at right angles it is conventional to position the transverse strands between spacer members, spaced to correspond to the eventual position of the strands in the net, by means of strand-laying arms, shuttles, slides or by a plurality of strand-laying spooling combs which are reciprocated by well-known mechanical drive means. In the case of nets having rhombic meshes, rotating spool supports are provided which carry a number of strands corresponding to the desired width of the nets. The rotating spool supports are frequently used for winding the longitudinal strands in helical form to produce tubular netting. A tubular net structure manufactured in this way must be subsequently separated after the points of intersection of the net strands have been secured together in order to obtain separate webs.

With the conventional reciprocatory feed of the transverse strands the output of conventional "laying" machines is extremely limited. With the manufacture of nets having rhombic meshes, i.e. obliquely intersecting strands, the additional steps noted heretofore of separating the tubular netting must be performed. Thus, conventional apparatus for manufacturing netting is time-consuming and relatively inefficient.

Summary

In keeping with the above, it is a primary object of this invention to provide novel apparatus which can "lay" strands during the manufacture of netting at high speeds which corresponds to the fastest welding speeds now possible with present electronically controlled strand-welding mechanisms. The invention is characterized by providing a novel feed device for the feeding or laying of transverse strands or threads, the device being rotatable about an axis in the laying plane of the netting and perpendicular to the netting plane about a hollow shaft which receives the transverse strands and, additionally, including transverse strand-holding means rotating in situ at longitudinal sides of and extend in a direction parallel to the direction of advancement of the netting with welding rollers rotating in timed sequence with the translatory movement of the netting.

In accordance with such apparatus it is possible to manufacture welded netting without employing conventional slow reciprocating mechanisms for laying the transverse strands. The laying of the transverse strands is effected directly in the plane in which the netting is being formed, and are thus always held under a predetermined tension so that the welding of the intersecting strands can be done immediately upon the intersection of each strand with other strands of the netting. The feeding of the transverse strands or wires through hollow shafts of the apparatus permits the supply spools to be mounted in a fixed position which is accessible from outside the apparatus. This makes it possible for the strands to be replenished or the spools to be changed without the necessity of stopping the laying apparatus.

The use of only rotating strand-laying mechanisms makes it possible to produce manufacturing speeds which are substantially faster than the manufacturing speeds of known apparatus. As a consequence increased output of the machine is possible during the laying of the netting. Furthermore, the apparatus permits marginal wires for the nets to be passed through the wire-holding means, which are preferably constructed as rotating coils. The marginal wires extend through loops of the layers of transverse wires, and the marginal and transverse wires can be welded to one another without interference.

Longitudinal wires are fed directly over welding rollers of a welding mechanism of the novel apparatus. Each of the rollers of the welding mechanism is formed of rings which are alternately fed positive and negative pulses with selected rollers being comprised of a plurality of toothed insulated guide discs for guiding the netting during the manufacture and advancement thereof. Other rollers of the welding mechanism are composed of discs arranged on an isulated core with the discs being electrically connected to one another by conductive transverse pins.

The invention will be immediately hereinafter more fully described by reference to the constructional examples shown in the drawing in which:

FIG. 4 is a diagrammatic view, and illustrates a pulley or roller for guiding a longitudinally extending strand of the net;

FIG. 5 is a side elevational view of a guide pulley, and clearly illustrates the toothed configuration thereof;

Figure 1:
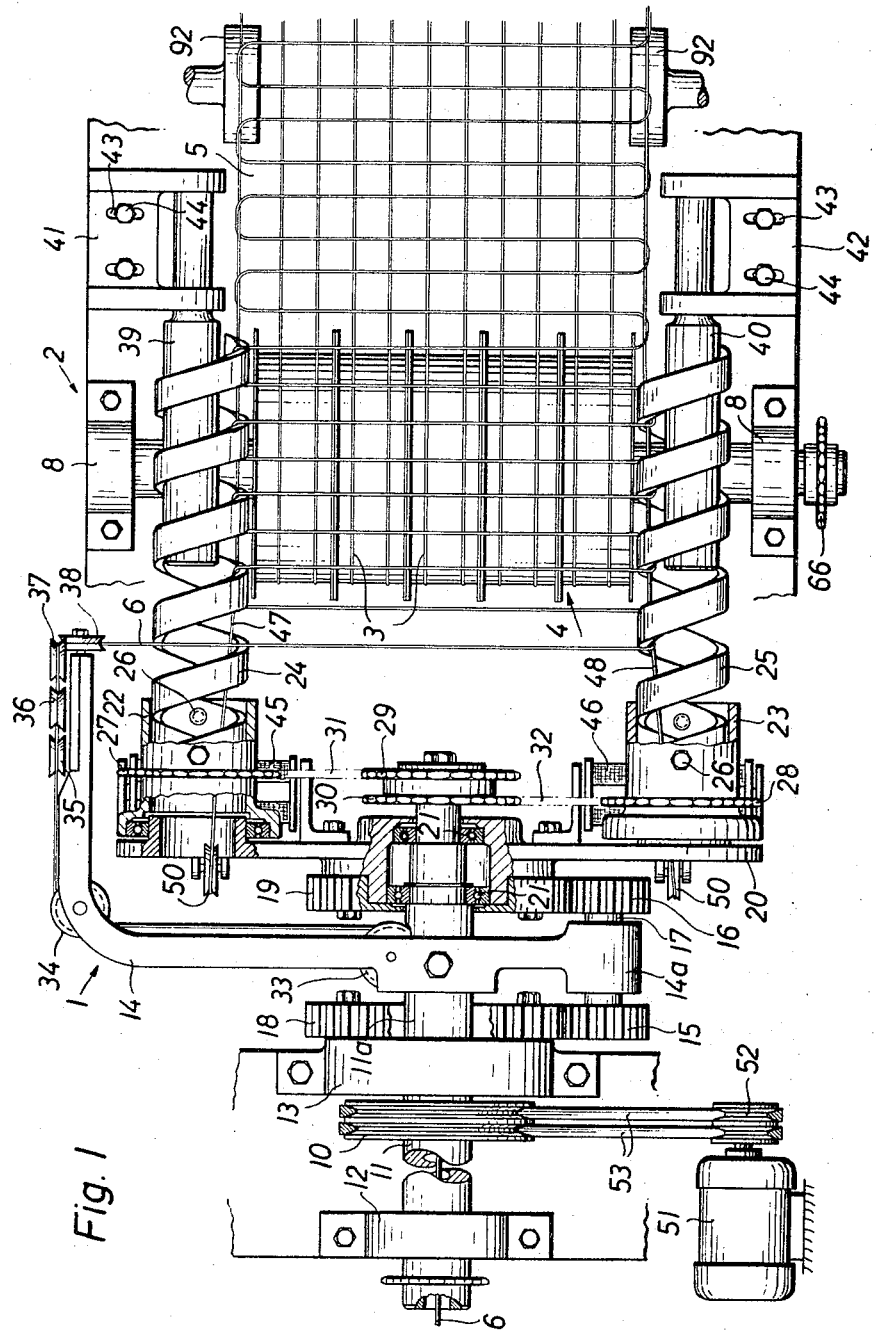
FIG. 1 is a diagrammatic fragmentary top plan view of the apparatus for manufacturing netting according to the invention with parts omitted for clarity, and illustrates the general arrangement of components for forming and advancing a right-angle mesh net.
Figure 2:
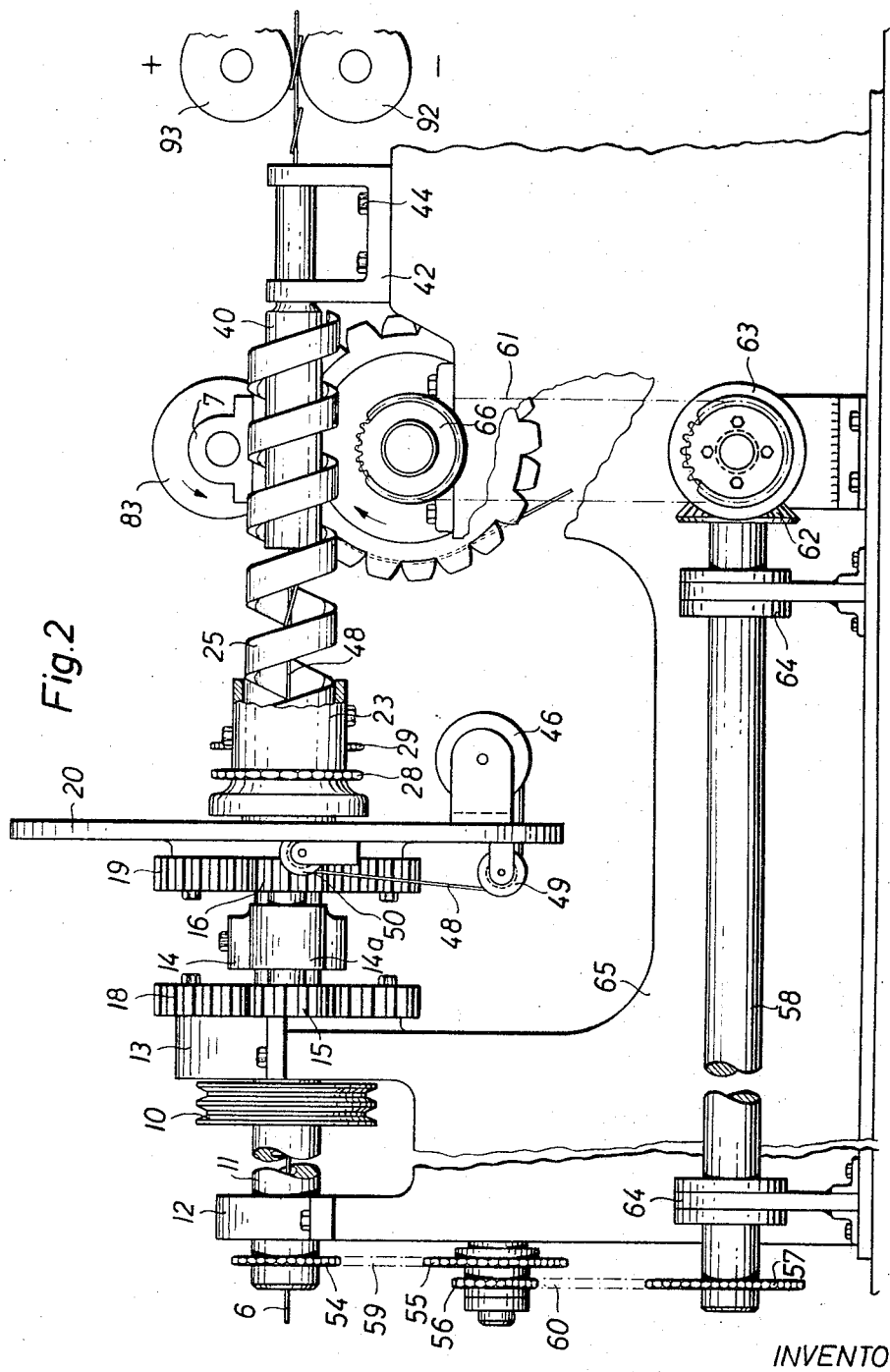
FIG. 2 is a fragmentary side elevational view of the apparatus shown in FIG. 1, and illustrates a drive mechanism of the apparatus and one of a pair of coil-like transverse strand feeders.

FIG. 6 diagrammatically illustrates the welding mechanism of the apparatus, and clearly shows two welding rollers in the operative position thereof during the welding of the net; and FIG. 7 is a cross-sectional view of another construction of an upper one of the rollers of FIG. 6, and illustrates the transverse electrically conductive pins forming a portion thereof.

The apparatus for the manufacture of netting from metallic strands or wires intersecting at right angles or diagonally comprises a laying device 1 and a welding mechanism 2, as is best illustrated in FIGS. 1, 2, 4 and 6 of the drawings. Longitudinal threads 3 (FIG. 1) are fed over a lower welding roller 4 (FIGS. 1 and 6) into a horizontal laying plane of a progressively formed net 5. The roller or rollers 4 of the welding mechanism 2 are journaled in the bearings 7 and 8 (FIGS. 2 and 1, respectively) and are driven in opposite directions.

The formation of a layer of transverse wires of the netting 5 is produced by means of a single wire 6 (FIGS. 1 and 5). The means for feeding the transverse wire 6 comprises a hollow rotatable shaft 11 (FIG. 1) which is driven by a V-belt pulley 10. The shaft 11 is journaled in axially aligned bearings 12 and 13 and includes a projecting shaft portion 11a (FIG. 1) on which a wire-laying arm 14 is fixedly secured. Two gears 15, 16 are carried by an end portion 14a of the arm 14. The gears 15, 16 are journaled on a shaft 17 carried by the arm portion 14a. The gears 15 and 16 mesh with gears 18 and 19, respectively. The gear 18 is fixedly connected to a bearing block 13. The gears 15 and 16 act as planet gears of the respective gears 18 and 19. The gear 19 is connected to a plate 20 which is freely rotatably mounted on the projecting portion 11a of the hollow shaft 11 by means of a ball bearing 21. Arranged on the ends of the plate 20 are rotatably mounted bushings 22 and 23 (FIG. 1) and on which freely extending coils 24 and 25 are fixed, for example, by means of screws 26. The bushings 22 and 23 are provided with sprockets 27 and 28. In a similar manner the hollow shaft 11 is provided at its free end with sprockets 29 and 30. The sprockets 27, 29 and 28, 30 are connected by respective chains 31 and 32. The transmission ratio of the sprockets is 1:1. Upon the rotation of the shaft 11, as will be more apparent hereinafter, and the simultaneous rotational movement of the arm 14 the planet gear 15 in mesh with the gear 18 transmits its rotation through the shaft 17 to the planet gear 16 which engages with the gear 19 on the plate 20.

The endless transverse wire 6 passes through the bore (unnumbered) in the shaft 11 and is guided over deflecting rollers 33 and 34 to tensioning rollers 35, 36, 37 and a guide roller 38 from which the wire 6 is fed transversely to the netting 5.

The transverse wire 6 passes back and forth between the coils 24 and 25, as is clearly shown in FIG. 1. With each revolution of the shaft 11 and the wire-laying arm 14 carried thereby the coils 24 and 25 are rotated at a ratio of 1:1 by the predetermined pitch thereof and causes advancement of the wire 6 as the latter is guided around the coils 24, 25. The guide roller 38 is so arranged that the transverse thread 6 is guided in a circular curve around the two coils 24 and 25 and is guided by the edges of the coils in the manner clearly shown in FIG. 1 of the drawings.

The coils 24 and 25 are arranged on the plate 20 at a distance corresponding to the width of the netting. The coils 24, 25 are guided by supporting rods or rollers 39 and 40, respectively on each side of the net 5, and the supporting rollers 39 and 40 are rotatably mounted in bearing blocks 41 and 42, respectively. The bearing blocks 41 and 42 are adjustable transversely of the longitudinal axis of the net 5 by means of screws 44 engaged in slots 43. In this manner the supporting rollers 39, 40 can absorb any tension of the transverse wire 6 directed towards the center of the netting and it is possible to regulate the tension of the transverse wire 6 by shifting the bearing blocks 41, 42. With each revolution of the coils 24, 25 a looping of the transverse wire 6 is effected alternately on one side and the other of the net 5. For manufacturing a net of different mesh width the coils 24 and 25 are replaced by coils having a different pitch than those illustrated. The spacing of the longitudinally spaced portion of the transverse wire 6 corresponds to half the pitch of the coils 24, 25.

The apparatus of this invention also provides means for feeding wires 47, 48 into return loops of the transverse wire 6. For this purpose, supply spools 45 and 46 for these reinforcing wires are carried by the back of the plate 20. The wires 47 and 48 are drawn off the spools 45, 46 and are guided over guide rollers 49 and 50 through the coils 24 and 25. The transverse wire 6 is guided around the reinforcing wires 47, 48 during the formation of the net 5, as is clearly and best shown in FIG. 1 of the drawings.

The various components of the apparatus are driven by a motor 51, a V-belt pulley 52 and a pulley belt 53 entrained about a pulley belt 10 which is fixed to the hollow shaft 11. The welding rollers are driven by a take-off transmission from the shaft 11. For this purpose there are provided sprockets 54–57, a transmission shaft 58, chains 59, 60 and 61 and bevel gears 62 and 63. The shaft 58 is mounted in bearings 64 on a frame 65 of the apparatus.

Figure 3:
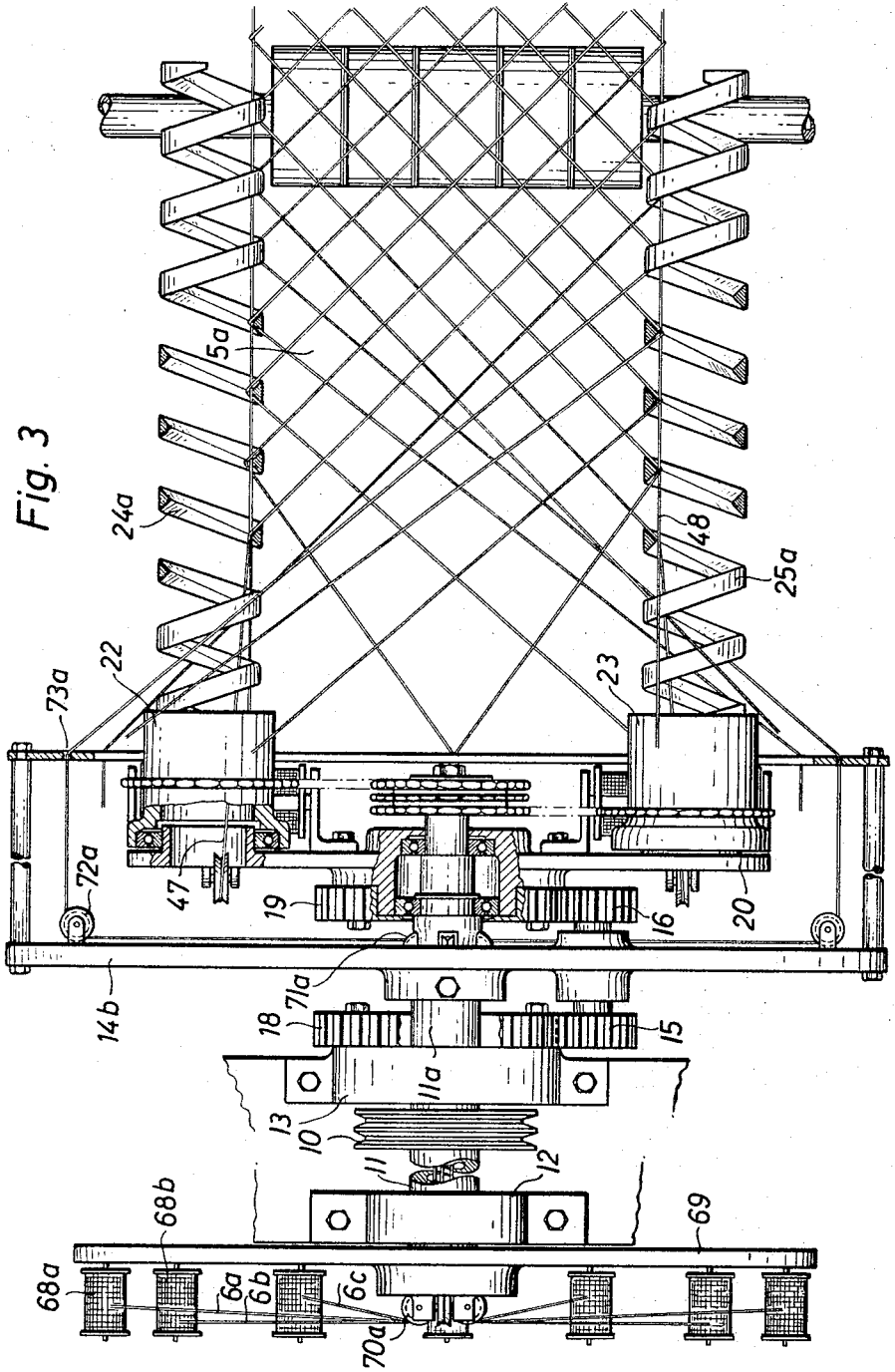
FIG. 3 is a view similar to FIG. 1, but shows a modification thereof for the manufacture of a net having diagonally intersecting threads to form a rhombic-meshed net.

FIG. 3 shows a modified form of the apparatus for manufacturing a tubular net 5a having wires intersecting diagonally, i.e. a rhombic mesh. A plate or a star-shaped arm 14b is fixed on the shaft 11 or the projecting portion 11a thereof. A plurality of transverse wires 6a, 6b 6c, etc. are supplied from outside the apparatus through the hollow shaft 11. Supply spools 68a, 68b, 68c, etc. are arranged on a plate 69 which is accessible from outside the machine. Transverse wires 6a, 6b, 6c, etc. are supplied over guide rollers 70a, b, c, etc., 71a, b, c, etc., and 72a, b, c, etc., and guide eyes 73a, b, c, etc. from supply rollers 68a, b, c. From the guide eyes the transverse wires pass to coils 24a and 25a. The transverse wires discharge in succession from the guide eyes 73a, b, c and pass to the coils 24a and 25a so that upon each complete revolution of the plate 14b and the corresponding forward movement of the transverse wires through the coils a net is produced which has wires intersecting one another in exact diagonal relationship.

The welding mechanism of each of the apparatuses consists of the lower welding roller 4 and an upper welding roller 75 (FIGS. 6 and 7) which are mounted on shafts 76 and 77. The welding roller 4 is composed of separate rings 78, 79 which are constructed as ring core transformers with alternately disposed and spaced positive and negative poles. Intermediate discs 80 are provided at regular intervals which serve to guide the transverse or diagonal wires 6, 6a, 6b, etc. The intermediate or guide discs 80 are formed as toothed discs. Each guide disc is advantageously composed of two toothed discs 81a and 81b (FIG. 4) with the teeth offset from one another, the discs being arranged staggered relative to one another by the width of one tooth. Thus, each guide disc 80 is composed of the toothed discs 81a and 81b which define gaps 8a in which the transverse wires 6, 6a etc. are positioned, fed and guided. Electrode discs 80 serve as bridges for the rings 78 and 79 which form a bundle of discs consisting, for example, of discs 84 and 85 of electrically conducting material and an intermediate disc 86 of insulating material, e.g. rubber. The entire pack or bundle of discs is arranged on a shaft 77 upon which is interposed a sleeve 87 of insulating and resilient material, e.g. rubber. By this arrangement of the elastic sleeve 87 radial movement of the separate discs is possible. The electrically conducting discs 84 and 85 are electrically coupled by means of conductive transverse pins 88. The transverse pins are located in relatively large bores 89 so that a radial movement of the discs of one bundle or pack is assured.

It is preferred to assemble the pack of discs from a large number of discs which are electrically insulated from one another. In this case, the transverse pins 88 connect the discs to one another and are separated by the same spacing. As is illustrated in FIG. 7, discs 90 and 91, 90b and 91b, etc. are connected by the conductive pins 88 which are positioned in holes of a large diameter and contact the discs only by their end surfaces. In this way uniform electrical transition paths are provided for the bundle of discs serving as an electrical bridge.

In order to weld the marginal or reinforcing wires 47, 48 to the lateral loop of the net 5 a separate pair of welding rollers 92 and 93 are provided at a distance from the coils 24 and 25. In this way a net is obtained in which the wires are welded to one another at all points of intersection.

What is claimed is:

1. In apparatus for the manufacture of netting of the type having intersecting longitudinal and transverse strands which are secured to one another, means for feeding the longitudinal strands into a plane of the finally formed netting, means for feeding a transverse endless strand across the longitudinal strands, the improvement comprising a feed device for the transverse strands, said feed device being rotatable about an axis in the plane of the netting, means coupled to said feed means and rotating in a plane perpendicular to the plane of the netting, said last mentioned means being rotatable around a hollow shaft, means for feeding the transverse strand through said shaft, holding means rotatable in situ along the longitudinal sides and in the direction of advance of the netting and pairs of welding rollers rotatable in timed relation to the advancement of the netting.

2. The apparatus according to claim 1, including means for feeding marginal strands through the transverse feeding means, and said transverse feeding means being a plurality of coils.

3. The apparatus according to claim 2 wherein for forming a netting with rhombic meshes transverse strands are fed by means to successive portions of the plurality of coils.

4. The apparatus according to claim 2 wherein a support is provided inside each of the coils and means for transversely adjusting said support relative to its longitudinal axis.

5. The apparatus according to claim 2, including a welding roller, means for welding said longitudinal and transverse strands.

6. The apparatus according to claim 5 wherein a roller of the welding roller means is composed of a plurality of rings which are of an alternate electrically positive and negative construction, and toothed guide discs of insulating material for guiding selected ones of said strands.

7. The apparatus according to claim 6 wherein the guide discs each consists of two separate discs having teeth offset from each other.

8. The apparatus according to claim 5 wherein another roller of the welding roller means is composed of a bundle of discs supported on an insulated core and said discs being electrically connected to one another by conductive pins.

9. The apparatus according to claim 8 wherein the discs of two adjacent bundles of discs are equally spaced from one another, and the pins are mounted in holes in the discs of larger diameter than the pins.

10. The apparatus according to claim 2 wherein welding rollers are provided for welding marginal strands to others of the strands.

11. The apparatus according to claim 2 wherein the coils are triangular in transverse cross-section.

12. The apparatus according to claim 2 wherein the feed means for the transverse strands comprises an arm which is fixed to a rotatable driven hollow shaft, said hollow shaft having a plate mounted thereon, and said coils being carried by said plate.

References Cited
UNITED STATES PATENTS

| | | | |
|---|---|---|---|
| 2,874,731 | 2/1959 | Smith | 140—71 |
| 2,971,543 | 2/1961 | Glynn | 140—112 |
| 3,063,476 | 11/1962 | Roesler | 140—112 |

CHARLES W. LANHAM, *Primary Examiner.*

L. A. LARSON, *Assistant Examiner.*